April 7, 1970     J. D. RYAN ET AL     3,505,092

METHOD FOR PRODUCING FILMED ARTICLES

Original Filed Nov. 2, 1964

INVENTORS
Joseph Dennis Ryan
and Edward A. Small, Jr.

Nobbe & Swope
ATTORNEYS

United States Patent Office 3,505,092
Patented Apr. 7, 1970

3,505,092
METHOD FOR PRODUCING FILMED ARTICLES
Joseph Dennis Ryan and Edward A. Small, Jr., Toledo, Ohio, assignors to Libbey-Owens-Ford Company, a corporation of Ohio
Continuation of application Ser. No. 408,124, Nov. 2, 1964. This application June 14, 1968, Ser. No. 745,067
Int. Cl. C23c 13/02; C23b 9/00; B44d 5/06
U.S. Cl. 117—33.3                                    6 Claims

ABSTRACT OF THE DISCLOSURE

Method of producing a filmed article including a transparent substrate, comprising first vacuum depositing at least one thin film on a surface of the substrate and then vacuum evaporating a transparent oxide protective coating onto the free surface of the thin film at a rate of at least 10 micro-inches per minute and continuing the evaporating until the protective coating has a thickness in the range of from 0.1 mil to 1 mil.

---

This application is a continuation of application Ser. No. 408,124, filed Nov. 2, 1964, and now abandoned.

This invention relates generally to the production of articles for use in various optical applications, and more particularly relates to glazing units provided with thin optical films for modifying the light and/or solar radiation transmittance properties of the transparent glass or plastic substrates of such units.

It has long been appreciated that glass windows transmit large amounts of solar radiation and thus have a very definite effect upon the temperature within a building, automobile, or other enclosures in which they are placed. If the amount of solar radiation transmitted by the glazing units can be reduced, it is evident that a substantial reduction can be made in the air conditioning and heating load of the particular installation in which they are used.

At the present time glazings for architectural use wherein it is desired to reduce the transmission of solar radiation into the interior of a building have required the use of special composition glasses having heat absorbing properties. However, while these special glasses have been found to some extent to be effective in decreasing radiation transmittance, the fact remains that since they act to intercept radiation by absorption, their temperature may eventually be increased to a point where they become a radiator with part of the heat going to the inside of the enclosure and part of the heat going to the outside. Moreover, equal distrbution of re-radiated heat from heat absorbing glass would take place only when the conditions outside and inside the building are the same with respect to air temperatures and convection and conduction losses.

The use of vacuum evaporated heat reflecting metal, metal halide or metal oxide films to provide a coated glass of controlled visible transmittance have been contemplated. Such coated glass would, of course, be highly desirable for architectural use due to the multiplicity of color effects obtainable therewith, the great flexibility in producing glazings having varied light and radiation transmittance properties and the fact itself that such coated glass would eliminate the need for a special composition glass and the significant expense involved with its use. However, up to the present time the use of such films has remained only visionary due to their fragile nature or their inability to withstand mechanical damage or weathering.

In this respect, for the use of such films to be effective it is necessary that the filmed side of the glass be glazed on the outside of the building since ordinary window and plate glass have appreciable absorption of near infrared radiation. Glazing the film to the outside avoids the absorption which would otherwise result from allowing the incident radiation to pass through the glass, be reflected from a film on the rear surface, and again pass through the glass before being rejected. Hence, glazing the heat reflecting film to the outside allows for a higher rejection of radiant energy by reflection rather than by absorption thus reducing heat build-up in the glass and re-radiation of the heat to the interior of the building.

A similar, but even more severe problem, is encountered when the use of vacuum evaporated thin films is considered for automobile glazings. Thus, in these applications the glass sheets must be bent to a desired curvature, and in order for the deposition of the films to be practicable, it is necessary that the films be applied prior to the shaping or bending step. Thus, the films must be capable of withstanding without deterioration, the heating step prior to bending, which step involves temperatures up to the softening temperature of the glass, e.g. 1000 to 1200° F., as well as physical deformation of the substrate. Vacuum evaporated films at the present time are not capable of withstanding such treatments.

In addition to architectural and automobile applications, it would also be highly desirable to enable the more rugged use of articles such as lenses, filters, and mirrors having various vacuum deposited metal or metal oxide multilayer films applied thereto since extreme caution must now be taken to protect these articles from the elements, mechanical handling, scratching, etc. Also in the case of electrically conducting films, for example for use in aircraft, and the like, it has heretofore been necessary to employ a laminated structure with the film being applied to one of the interior bonded surfaces of the glass due to the extreme fragile nature thereof. Thus, while the benefits and advantages of employing vacuum evaporated thin films in numerous applications not heretofore possible is readily evident, their use is prohibited by the nature of the films themselves.

In this connection, it has previously been proposed to provide protective layers or coatings, for example of $SiO_2$ or $MgF_2$ over the metal or metal oxide films to protect the latter from physical damage. However, these protective layers have been on the order of only 300 to at most 2000 angstrom units in thickness, and while they greatly aid in protecting the films from scratching and handling during assembly of the units, they are not effective to withstand severe weathering or protect the optical films during heating and bending treatments.

The present invention enables the use of vacuum deposited thin optical films in architectural, automotive and other applications where damage to the films by weathering, heat and shaping is contemplated by the provision of an extremely thick, abrasion resistant transparent overcoat or protective layer applied over the optical film or films. Such protective coating is preferably on the order of 0.1 to 1 mil in thickness and tenaciously adheres to the glass or plastic substrate and optical film even during bending of the substrate at high temperatures, but does not in any manner adversely affect the optical qualities of the glazing unit, mirror, lenses, etc. as provided or enhanced by the films.

It is, therefore, a principal object of this invention to provide a method of producing a coated article including a glass or plastic substrate having one or more optical films vacuum evaporated on a surface thereof, which article may be permanently located or positioned with its filmed side exposed to the elements without deterioration of the films.

It is a further object of this invention to provide a method of producing an article composed of thin, vacuum evaporated light modifying films on glass substrates which may be heated to temperatures up to 1200° F. and bent without destruction of the films.

Other objects and advantages of the invention will become more apparent during the course of the following description when taken in connection with the accompanying drawings.

In the drawings, wherein like numerals are employed to designate like parts throughout the same:

Figure 1:
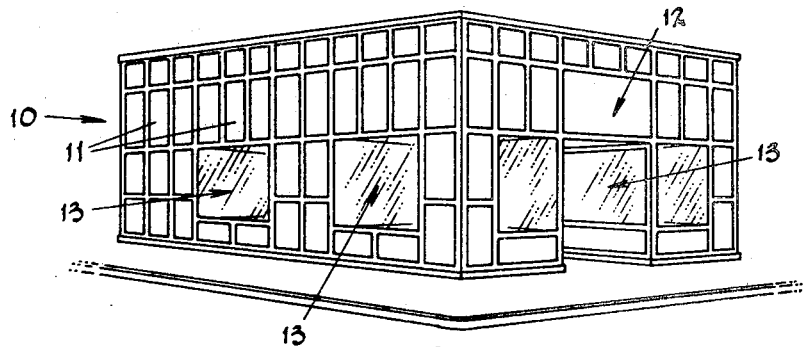
FIG. 1 is a perspective view of a building including a glazing unit in accordance with the invention.

Generally stated, the article produced in accordance with the method of this invention comprises a substrate of a transparent material selected from the group consisting of glass and plastic, at least one light modifying vacuum evaporated thin film adhered to a surface of said substrate, and a vacuum evaporated transparent protective coating adhered to the free surface of said thin film, said protective coating consisting essentially of an oxide of an element selected from the group consisting of aluminum, silicon, titanium, cerium, zirconium and mixtures thereof and having a thickness in the range of from 0.1 to 1 mil, and preferably in the range of 0.25 mil to 1 mil.

The vapor sources preferred for use in accordance with the invention employ electron bombardment heating to vaporize the materials to be deposited as films or coatings upon the glass or plastic substrate. By controlling the electrical energy supplied to the electron beams, the vaporization rates of the materials may be precisely controlled and can be varied rapidly over a wide range of values. In this respect, the vacuum chamber may include several sources and associated electron bombardment heating means which may be activated at different intervals or simultaneously. For example, one of the sources may be utilized to lay down the light modifying film and another source utilized to lay down the protective coating. Further, and in accordance with a preferred embodiment of the invention wherein a mixture of $Al_2O_3$ and $SiO_2$ is employed as the protective coating, two separate sources for the protective layer may be employed, one of which contains granulated silica and the other granulated alumina, and such sources bombarded simultaneously to effect an intimate mixture of the two materials during evaporation.

In the high vacuum provided, vapor molecules travel unimpeded from the vapor source to the substrate being coated, and become part of the coating at their point of impact; thus, the several constituent compounds deposited at the same time are intimately co-mingled at the molecular level within the coating, whereby the coatings are very uniform in composition except for any variations which might intentionally be produced by varying the relative rates at which the several vapors are generated. These coatings are additionally extremely mechanically strong, and result in the elimination of many prior art problems such as blistering, peeling, and the like caused by poor adherence between adjacent layers, encountered particularly when thicker coatings, e.g. even 1500 angstrom units in thickness, were attempted to be produced.

It has been found that silica, alumina, titanium dioxide, cerium oxide and zirconium oxide because of their abrasion resistance, hardness, relative chemical inertness and the fact that these materials or mixtures thereof can be laid down in the thicknesses required and still be transparent and colorless are the substances best suited for use as the protective overcoat in the article in accordance with the invention. Further, it has been found that these oxides or mixtures thereof will adhere to glass or plastic substrates even in film thicknesses up to 1 mil when vacuum evaporated at relatively high rates, e.g. over 10 micro inches per minute and up to 100 or more micro inches per minute, this latter step being an important feature of the invention and necessary if one is to obtain the novel product in accordance therewith. In this respect, higher deposition rates tend to reduce crystallite sizes and result in the formation of a more amorphous film. This is believed to be the main factor responsible for the lower porosity, greater adhesion, greater durability and greater chemical stability of the protective layers in accordance with the invention.

In addition, the stresses in the heavy overcoat layers are effected by the rate of deposition and with the various materials and combinations thereof contemplated by the invention for the protective layer the deposition rates may be varied to produce higher stability.

The light modifying thin films over which the protective coating is applied may comprise opaque or transparent metal or metal alloy films such as aluminum, chromium, nickel, iron and nichrome; opaque or transparent metal films such as gold, silver and copper applied over thin adhesive layers previously evaporated onto the glass or plastic substrates; and light modifying metal oxide films, for example comprised of iron oxides, cobalt oxides, cerium oxide and silicon monoxide. In addition, the protective overcoat may be applied over multiple layer interference coatings of all types including various combinations of metal and metal oxide absorbing and non-absorbing layers, as well as over filters, heat reflectors, and cold mirrors.

The following examples constitute the best presently known mode for practicing the instant invention.

EXAMPLE I

An 18 inch by 32 inch piece of nominal .125 inch thick ground and polished plate glass was washed with detergent and water and then cleaned with a chalk mixture and rubbed with clean cotton cloths. The resulting clean plate glass sample was placed in a vacuum chamber equipped with a high voltage discharge electrode, a glass heater, three electron beam evaporation sources and an optical monitoring system such as is generally used for controlling the thickness of films during vacuum deposition thereof. The chamber was next evacuated to a pressure of 20 microns of mercury and the plate glass sample further cleaned at this pressure by ionic bombardment through the application of 2,000 volts D.C. to the glow discharge electrode for 10 minutes. The vacuum chamber was then further evacuated to $1.5 \times 10^{-5}$ torr.

One of the electron beam sources which had been previously loaded with particles of metallic chromium and located 48 inches from the plate glass sample was then activated and, using the optical monitor, an opaque chromium film of approximately 1000 angstrom units was deposited on the glass. This filmed glass sample was heated to 400° F. by activation of the glass heater in the vacuum chamber. Pure oxygen was next introduced into the vacuum chamber until the pressure therein rose from $1 \times 10^{-5}$ torr to $3 \times 10^{-5}$ torr. A second electron beam evaporation source which had been previously loaded with granulated silica and positioned 48 inches from the glass sample was then activated and the deposition rate of silica adjusted through the use of the optical monitor to 10 micro inches per minute. Upon the above deposition rate of the silica being established, the third electron beam evaporation source, previously loaded with granulated aluminum oxide and located 48 inches from the glass sample, was activated and the deposition rate thereof adjusted through the use of the optical monitor to 6 micro inches of aluminum oxide per minute. The vapor deposition of the silica and the alumina from the two sources operating simultaneously was continued until a total film thickness, consisting of an intimate molecular mixture of $Al_2O_3$ and $SiO_2$, of 400 micro inches was deposited upon the chromium film adhered to the glass sample. The great majority of this evaporation was observed to have taken place at a total pressure of $9 \times 10^{-5}$ torr and at a substrate or glass sheet sample temperature of 400° F. It should be noted that the rise in pressure from $3\times10^{-5}$ torr to $9\times10^{-5}$ torr is an expected phenomena caused by outgassing of the chamber and some dissociation of the evaporants.

After the above noted $Al_2O_3$–$SiO_2$ film thickness of 400 micro inches was obtained, the electron beam evaporation sources containing the $SiO_2$ and $Al_2O_3$ together with the glass heater were de-activated. The filmed glass sample was then allowed to cool, the pressure in the vacuum chamber raised to ambient pressure, and the sample removed therefrom. Close visual inspection and handling of the filmed sample, showed no cracks or defects in either the chromium film or the thick oxide deposit, and that the film was very durable.

The coated glass sample was then heated to approximately the softening point of the glass, i.e. 1100° F., in a furnace and bent to an approximately 36 inch radius. Upon cooling, the silica-alumina film showed no defects or optical absorption and the chromium film was not affected by the heating and bending treatments and showed no increase in transmissivity due to oxidation.

EXAMPLE II

A second 18 inch by 32 inch piece of nominal .125 inch thick ground and polished plate glass was cleaned, placed in the vacuum chamber, further cleaned by ionic bombardment, and an opaque chromium film deposited thereon in exactly the same manner set forth in Example I. This filmed glass sample was then heated to 400° F. by activation of the glass heater in the vacuum chamber and pure oxygen then introduced into the chamber until the pressure rose from $1\times10^{-5}$ torr to $5\times10^{-5}$ torr. The electron beam evaporation source containing the granulated alumina was then activated and the deposition rate thereof adjusted through the use of the optical monitor to 3 micro inches per minute. Upon the above deposition rate of the alumina being established, the third electron beam evaporation source containing granulated silica was activated and the deposition rate thereof adjusted through the use of the optical monitor to 10 micro inches per minute. The vapor deposition of the alumina and the silica from the two sources operating simultaneously was continued until a total film thickness, again consisting of an intimate molecular mixture of $Al_2O_3$ and $SiO_2$ of 400 micro inches was deposited upon the chromium film adhered to the glass sample.

Upon cooling of the glass sample and removal thereof from the vacuum chamber, the films were inspected. This inspection showed no cracks or other defects in either the chromium film or the thick oxide deposit. The films were found to be very durable.

EXAMPLE III

A 36 inch by 36 inch piece of nominal .125 inch thick polished plate glass was washed with detergent and water and then cleaned with a suspension of precipitated chalk and rubbed with clean cotton cloths. It was placed in a vacuum chamber equipped with a high voltage glow discharge electrode, a glass heater, one small electron beam evaporation source and one large electron beam evaporation source and an optical monitoring system. After evacuation of the chamber to 20 microns, the glass was further cleaned by ionic bombardment by applying 2000 volts DC to the glow discharge electrode for 10 minutes. The chamber was then evacuated to $1.5\times10^{-5}$ torr. The glass was heated to 400° F. and using the small electron gun source from a distance of 6 feet and using the optical monitoring system a layer of chromium was deposited on the glass having an optical transmissivity at 550 m$\mu$ of 40 percent. The glass was then moved by remote handling to a position near the large source. Next, pure oxygen was introduced into the chamber until the pressure rose from $1\times10^{-5}$ torr to $1\times10^{-4}$ torr and the large source containing granulated silica which was at a distance of 3 feet from the glass was activated to make a rapid deposition of silica. The rate of deposition was adjusted to approximately 100 micro inches per minute by use of the optical monitor and the deposition was continued for 6 minutes.

The resulting film was very durable and showed no cracks or defects. It measured .0006 inch thick in the area of the glass located nearest the silica source.

Its optical characteristics were as follows:

|  | Illuminant C source, percent | Total solar energy, percent |
|---|---|---|
| Transmissivity | 44.8 | 45.9 |
| Reflectivity, film side | 14.1 | 12.4 |
| Reflectivity, glass side | 12.3 | 9.9 |

Figure 2:
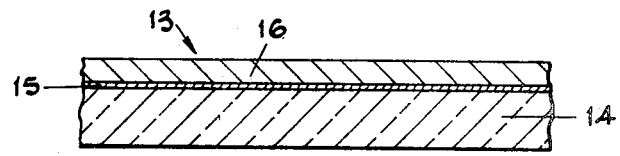
FIG. 2 is a greatly enlarged, fragmentary cross sectional view of the glazing unit illustrated in FIG. 1.

Referring now more particularly to the drawings, there is illustrated in FIG. 1 a modern type of building 10 which may include, for example, outside wall panels or spandrels 11, decorative lintel panels 12 and a plurality of windows or glazing units 13 constructed in accordance with the invention. Thus windows 13, in order to greatly reduce the transmission of solar radiation into the interior of the building, comprise a sheet of plate glass 14, a vacuum evaporated heat reflecting metal film 15 adhered to one surface of the glass, and a thick, vacuum evaporated transparent overcoat or protective layer 16 adhered to the metal film 15 (FIG. 2). The metal film may suitably comprise a 50 angstrom thick film of chromium while the protective overcoat comprises alumina, silica, titanium dioxide, cerium oxide, zirconium oxide or a mixture thereof and is of a thickness in the range of from 0.1 mil to 1 mil and preferably 0.25 mil to 1 mil. The windows are glazed such that the filmed sides thereof are positioned on the outside of the building 10.

Figure 3:
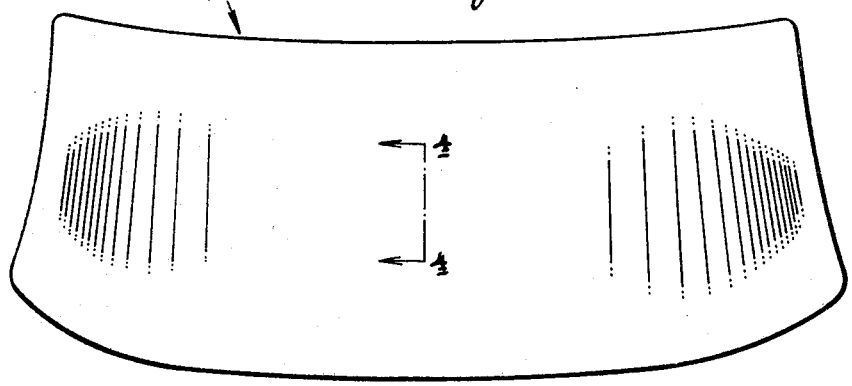
FIG. 3 is an elevational view of an automobile windshield coated in accordance with the invention.
Figure 4:
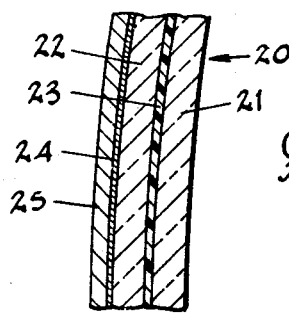
FIG. 4 is an enlarged fragmentary cross sectional view taken along the line 4—4 of FIG. 3.

FIGS. 3 and 4 illustrate a bent automobile windshield 20 produced in accordance with the invention. Thus the windshield 20 comprises two glass sheets 21 and 22 forming the inboard and outboard lites, respectively, of the unit integrally bonded together through an interposed thermoplastic interlayer 23. The exposed surface of the outboard lite 22 is provided with a vacuum evaporated, heat reflecting film 24, for example, comprising a 10 to 15 angstrom thick layer of chromium, and a protective layer 25 of silica, alumina, titanium dioxide, cerium oxide, zirconium oxide or a mixture thereof of a thickness in the range of from 0.1 mil to 1 mil.

Although the present invention has been described with reference to the specific details of certain embodiments thereof, it is not intended that such details shall be regarded as limitations upon the scope of the invention.

We claim:
1. A method of producing a filmed article including a substrate of a transparent material selected from the group consisting of glass and plastic, comprising depositing by vacuum evaporation at least one thin film on a surface of said substrate, vacuum evaporating at a rate of at least 10 micro-inches per minute a transparent protective coating onto the free surface of said thin film, said protective coating consisting essentially of an oxide of an element selected from the group consisting of aluminum, silicon, cerium, titanium, zirconium and mixtures thereof, and continuing said evaporation until said protective coating has a thickness in the range of from 0.1 mil to 1 mil.

2. A method of producing a filmed article as defined in claim 1, wherein said protective coating is deposited at a rate of from 10 to 100 microinches per minute.

3. A method of producing a filmed article as defined in claim 1, wherein the deposition of said protective coating is continued until a thickness of .25 mil to 1 mil is obtained.

4. A method of producing a filmed article as defined in claim 1, wherein said protective coating consists essentially of silica.

5. A method of producing a filmed article as defined in claim 1, wherein said protective coating consists essentially of an intimate mixture of silica and alumina.

6. A method of producing a filmed article as defined in claim 1, wherein said thin film is composed of at least one metal film selected from the group consisting of aluminum, chromium, nickel and iron.

References Cited
UNITED STATES PATENTS

| | | | |
|---|---|---|---|
| 2,366,687 | 1/1945 | Osterberg | 117—106 X |
| 2,501,563 | 3/1950 | Colbert et al. | 117—33.3 X |
| 2,586,752 | 2/1952 | Weber et al. | 117—71 X |
| 2,628,921 | 2/1953 | Weinrich | 117—71 X |
| 2,676,117 | 4/1954 | Colbert et al. | 117—33.3 X |
| 2,808,351 | 10/1957 | Colbert et al. | 117—33.3 X |
| 2,810,663 | 10/1957 | Reynolds et al. | 117—106 X |
| 2,854,349 | 9/1958 | Dreyfus et al. | 117—33.3 |
| 2,904,450 | 9/1959 | Irland et al. | 117—71 |
| 2,907,672 | 10/1959 | Irland et al. | 117—71 X |
| 2,920,002 | 1/1960 | Auwarter | 117—106 X |
| 2,964,427 | 12/1960 | Rheinberger et al. | 117—33.3 |
| 3,078,693 | 2/1963 | Lytle | 117—33.3 |
| 3,202,054 | 8/1965 | Mochel | 117—33.3 X |
| 3,274,025 | 9/1966 | Ostis | 117—106 X |

FOREIGN PATENTS 882,174   7/1953   Germany.

OTHER REFERENCES

Holland, Vacuum Deposition of Thin Films, pp. 135 to 140, 281–283; TS 695, H6 C.2; 1956.

WILLIAM D. MARTIN, Primary Examiner

U.S. Cl. X.R.

117—71, 106, 107, 124